United States Patent [19]

Nagamoto

[11] Patent Number: 5,509,005
[45] Date of Patent: Apr. 16, 1996

[54] POWER SAVING TIME SLOT INTERCHANGER WITH RANDOM READ/WRITE CYCLES

[75] Inventor: Mamoru Nagamoto, Tokyo, Japan

[73] Assignee: NEC Corporation, Tokyo, Japan

[21] Appl. No.: 315,484

[22] Filed: Sep. 30, 1994

[30] Foreign Application Priority Data

Oct. 1, 1993 [JP] Japan ................................. 5-247110

[51] Int. Cl.$^6$ .................................................. H04L 12/52
[52] U.S. Cl. ............................. 370/58.1; 370/66; 370/68
[58] Field of Search .................................... 370/58.1, 58.2, 370/61, 66, 68; 395/425, 481; 365/189.01, 230.01, 230.05

[56] References Cited

U.S. PATENT DOCUMENTS

| | | | |
|---|---|---|---|
| 4,740,953 | 4/1988 | Matsumoto et al. | 370/58.2 |
| 5,146,455 | 8/1992 | Goke et al. | 370/68 |
| 5,351,238 | 9/1994 | Ashi et al. | 370/66 |

*Primary Examiner*—Benedict V. Safourek
*Attorney, Agent, or Firm*—Sughrue, Mion, Zinn, Macpeak & Seas

[57] ABSTRACT

In a switching system of multiple time slot interchangers associated with outlet ports, each interchanger includes multiple data memories respectively connected to inlet ports and connected to the outlet port with which the interchanger is associated. A set of commands is established for each incoming data signal. The command set includes an inlet port number (IPN), an incoming slot number (ISN), an outlet port number (OPN), and an outgoing slot number (OSN). During a write cycle, one of the inlet ports is selected in accordance with the IPN command and one of the data memories which are associated with the selected inlet port is selected in accordance with the OPN command. The selected data memory is caused to store the data signal of an incoming time slot identified by the stored ISN command into one of its storage locations identified by the stored ISN command. During a subsequent read cycle, one of the outlet ports is selected in accordance with the OPN command and one of the data memories which are associated with the selected outlet port is selected in accordance with the stored IPN command. The selected data memory is caused to read a data signal from one of its storage locations identified by the ISN command onto an outgoing time slot identified by the OSN command.

6 Claims, 5 Drawing Sheets

FIG. 2

|  | ISN=0 | ISN=1 | ISN=2 | ISN=3 | ISN=4 |
|---|---|---|---|---|---|
| IPN=1 | A0 | A1 | A2 | (A3) | A4 |
| IPN=2 | B0 | B1 | B2 | B3 | B4 |
| IPN=3 | C0 | (C1) | (C2) | C3 | C4 |
| IPN=4 | D0 | D1 | D2 | D3 | D4 |
| IPN=5 | (E0) | E1 | E2 | E3 | E4 |
| IPN=6 | F0 | F1 | F2 | F3 | (F4) |

|  | OSN=0 | OSN=1 | OSN=2 | OSN=3 | OSN=4 |
|---|---|---|---|---|---|
| OPN=1 | C1 | E0 | F4 | C2 | A3 |

FIG. 3 PRIOR ART

|  | MA=0 | MA=1 | MA=2 | MA=3 | MA=4 |
|---|---|---|---|---|---|
| MEMORY 1 | A0 | A1 | A2 | (A3) | A4 |
| MEMORY 2 | B0 | B1 | B2 | B3 | B4 |
| MEMORY 3 | C0 | (C1) | (C2) | C3 | C4 |
| MEMORY 4 | D0 | D1 | D2 | D3 | D4 |
| MEMORY 5 | (E0) | E1 | E2 | E3 | E4 |
| MEMORY 6 | F0 | F1 | F2 | F3 | (F4) |
| RCM 8 | "31" | "50" | "64" | "32" | "13" |

FIG. 4

| IPN | ISN | OSN |
|---|---|---|
| 3 | 1 | 0 |
| 5 | 0 | 1 |
| 6 | 4 | 2 |
| 3 | 2 | 3 |
| 1 | 3 | 4 |

OPN=1

FIG. 7

|         | MA=0 | MA=1 | MA=2 | MA=3 | MA=4 |
|---------|------|------|------|------|------|
| WCM 26-1 | —    | —    | —    | 1    | —    |
| WCM 26-2 | —    | —    | —    | —    | —    |
| WCM 26-3 | —    | 1    | 1    | —    | —    |
| WCM 26-4 | —    | —    | —    | —    | —    |
| WCM 26-5 | 1    | —    | —    | —    | —    |
| WCM 26-6 | —    | —    | —    | —    | 1    |

FIG. 8

|            | MA=0 | MA=1 | MA=2 | MA=3 | MA=4 |
|------------|------|------|------|------|------|
| MEMORY 21-1 | —    | —    | —    | A3   | —    |
| MEMORY 21-2 | —    | —    | —    | —    | —    |
| MEMORY 21-3 | —    | C1   | C2   | —    | —    |
| MEMORY 21-4 | —    | —    | —    | —    | —    |
| MEMORY 21-5 | E0   | —    | —    | —    | —    |
| MEMORY 21-6 | —    | —    | —    | —    | F4   |

POWER SAVING TIME SLOT INTERCHANGER WITH RANDOM READ/WRITE CYCLES

BACKGROUND OF THE INVENTION

1. Field of the Invention

The present invention relates generally to time division switching systems, and more specifically to a power savings technique for a time slot interchanger of digital cross-connect systems.

2. Description of the Related Art

A prior art digital cross-connect system is of the type wherein a plurality of time slot interchangers are associated respectively with the outlet ports of the system and a plurality of data memories of each time slot interchanger are associated respectively with the inlet ports of the system. All data signals appearing at the inlet ports are sequentially stored in the data memories of all the time slot interchangers so that the same pattern of each incoming frame are held in multiple copies by the time slot interchangers. During a subsequent read cycle, the data memories of each time slot interchanger are randomly accessed and a sequence of stored signals is read out of the memories onto desired outgoing time slots for delivery to the associated outlet port. For each time slot interchanger, most of the stored data are not delivered to the outlet port. Therefore, the amount of power used for accessing the memories and writing the unused data is wasted.

SUMMARY OF THE INVENTION

Accordingly, an object of the present invention is to provide a power savings technique for reducing the power consumption of a time slot interchanger.

The stated object is achieved by writing data signals of an incoming frame on a random basis so that only those of the data signals desired for a time slot interchanger, are stored, and subsequently read on a random basis onto the slots of an outgoing frame.

According to one aspect of the present invention, there is provided a time division switching system having a plurality of inlet ports and a plurality of outlet ports. The system comprises a plurality of time slot interchangers associated respectively with the outlet ports. Each interchanger comprises a plurality of data memories having inputs thereof connected respectively to the inlet ports and having outputs thereof connected together to one of the outlet ports with which the interchanger is associated. A set of commands is established for each of a plurality of incoming data signals. The command set includes an inlet port number (IPN) identifying one of the inlet ports, an incoming slot number (ISN) identifying an incoming time slot end one of the storage locations of each data memory, an outlet port number (OPN) identifying one of the outlet ports, and an outgoing slot number (OSN) identifying an outgoing time slot. A plurality of write control memories are associated respectively with the inlet ports. One of the write control memories is selected in accordance with the IPN command and the ISN and OPN commands are stored in the selected write control memory. One of the data memories which are associated with the selected write control memory is selected in accordance with the stored OPN command, and the selected data memory is caused to store the data signal of an incoming time slot identified by the stored ISN command into one of its storage locations identified by the stored ISN command. A plurality of read control memories are associated respectively with the time slot interchangers as well as the outlet ports. One of the read control memories is selected in accordance with the OPN command and the IPN, ISN and OSN commands are stored in the selected read control memory. One of the data memories which are associated with the selected read control memory is selected in accordance with the stored IPN command and the selected data memory is caused to read a data signal from one of its storage locations identified by the stored ISN command onto an outgoing time slot identified by the stored OSN command.

According to a second aspect, the present invention provides a method of operation for a time division switching system having a plurality of inlet ports and a plurality of outlet ports. The system comprises a plurality of time slot interchangers associated respectively with the outlet ports. Each interchanger comprises a plurality of data memories having inputs thereof connected respectively to the inlet ports and having outputs thereof connected together to one of the outlet ports with which the interchanger is associated. A console is provided for setting a set of commands for each of a plurality of incoming data signals, the command set including an inlet port number (IPN) identifying one of the inlet ports, an incoming slot number (ISN) identifying an incoming time slot and one of the storage locations of each data memory, an outlet port number (OPN) identifying one of the outlet ports, and an outgoing slot number (OSN) identifying an outgoing time slot. The method comprises the steps of:

a) selecting one of the inlet ports according to the IPN command;

b) selecting one of the data memories which are associated with the selected inlet port in accordance with the OPN command;

c) causing the selected data memory to store the data signal of an incoming time slot identified by the stored ISN command into one of the storage locations thereof identified by the stored ISN command;

d) selecting one of the outlet ports in accordance with the OPN command;

e) selecting one of the data memories which are associated with the selected outlet port in accordance with the IPN command; and f) causing the data memory selected by the step (e) to read a data signal from one of the storage locations thereof identified by the ISN command onto an outgoing time slot identified by the OSN command.

BRIEF DESCRIPTION OF THE DRAWINGS

The present invention will be described in further detail with reference to the accompanying drawings, in which:

FIG. 2 shows a typical example of a plurality of input data signal sequences along with a sequence of output data signals;

FIG. 3 shows the contents of a data memory of the prior art system;

FIG. 4 shows command signals for operating a digital cross-connect system;

FIG. 7 shows the operating states of the write control memories of the system of FIG. 6 in relation to the data memories of a time slot interchanger and memory address signals; and FIG. 8 shows the contents of the data memories of the system of FIG. 6 during write and read modes.

DETAILED DESCRIPTION

Figure 1:
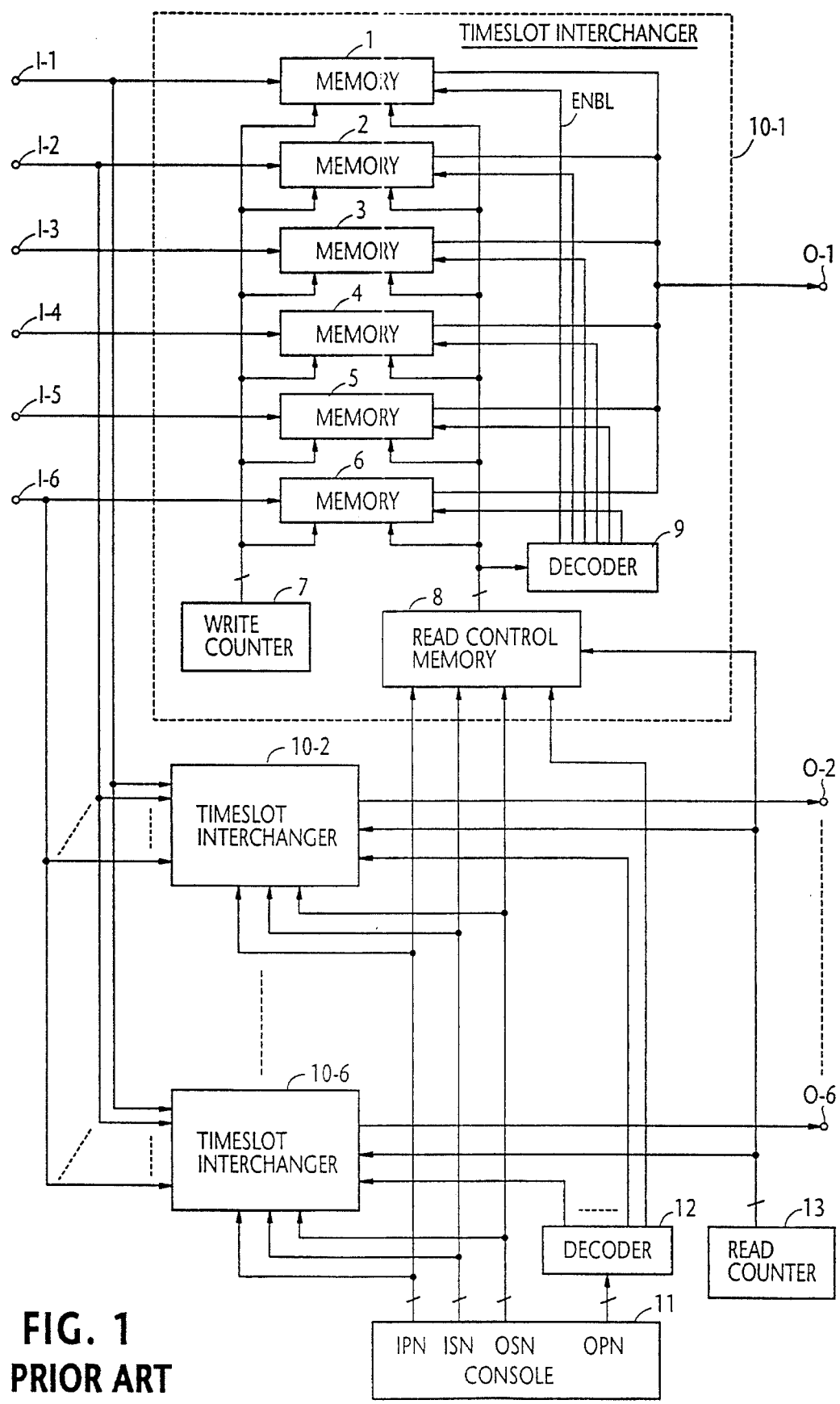
FIG. 1 shows in block diagram form a prior art digital cross-connect time division switching system.

Before proceeding with the detailed description of the present invention, it may prove helpful to provide an explanation of a prior art digital cross-connect time-division switching system with reference to FIG. 1.

The prior art time division switching system is of a sequential write random read type and comprises a plurality of time slot interchangers 10 (only six time slot interchangers 10-1~10-6 are illustrated for simplicity) and a console 11. The time slot interchangers are associated in a one-to-one correspondence with output ports 1-1~1-6 of the system, which are identified by output port numbers OPN=1~OPN=6, respectively. Each time slot interchanger is comprised by data memories 1 to 6 having their inputs connected respectively to the inlet ports I-1~I-6 of the system, which are identified by inlet port numbers IPN=1~IPN=6, respectively. Each data memory has a plurality of storage locations identified by memory addresses MA=0 through MA=4 which correspond respectively to incoming slot numbers ISN=0~ISN=4 during write operation, as well as to outgoing time slot numbers OSN=0~OSN=4 during read operation. The outputs of the memories 1~6 of each time slot interchanger are connected together to a corresponding one of the outlet ports O-1~O-6 which are identified by outlet port numbers OPN=1~OPN=6, respectively. A write counter 7 is provided in each of the time slot interchangers to sequentially supply a write memory address to the data memories to write incoming signals from the inlet ports into the corresponding data memories. Read operations of the data memories are controlled by a read control memory 8 and a decoder 9 provided in each time slot interchanger. Read control memory 8 is enabled by a signal supplied from a decoder 12 which decodes the outlet port number OPN command supplied from the console 11. Console 11 is responsible for the supply of switching commands including the inlet port number (IPN), incoming slot number (ISN), outlet port number (OPN) and outgoing slot number (OSN).

The read control memory 8 of time slot interchanger 10-1 receives an OPN=1 command from the decoder 12 and a set of commands IPN, ISN and OSN from the console 11. These commands are stored during operation. Decoder 9 decodes the IPN command stored in the read control memory 8 and enables one of the data memories. Read control memory 8 utilizes the ISN and OSN commands to determine which of the read addresses supplied from the read counter 13 is to feed to the data memories 1 to 6. As a result, the signal stored in the enabled data memory is read out from one of its memory locations specified by the read address signal corresponding to the incoming slot number.

More specifically, assume that five sets of incoming data signals (A0~A4), (B0~B4), (C0~C4), (D0~D4), (E0~E4) and (F0~F4) are supplied from inlet ports I-1~I-6, respectively, and their time slots are interchanged by the time slot interchanger 10-1 so that signals C1, E0, F4, C2 and A3 appear in sequence at the outlet port O-1 (see FIG. 2). Write address signals, synchronized to the incoming signals, are supplied from write address generator 7 so that all the locations of memories 1-6 identified by addresses MA=0 through MA=4 are filled with the corresponding incoming signals as shown in FIG. 3. Since C1, E0, F4, C2 and A3 are respectively identified by five sets of command pairs (IPN=3, ISN=1), (IPN=5, ISN=0), (IPN=6, ISN=4), (IPN=3, ISN=2) and (IPN=1, ISN=3), the read control memory 8 are sequentially supplied with these signals "31", "50", "64", "32" and "13" corresponding to commands OSN=0, OSN=1, OSN=2, OSN=3 and OSN=4, respectively (see FIG. 4), and a sequence of data signals C1, E0, F4, C2 and A3 is delivered to the outlet port O-1.

It is seen that in each time slot interchanger only a portion of all the stored signals is used for delivery to the corresponding outlet port while the other signals are used by the other time slot interchangers. Accordingly, most of the stored signals are useless for each time slot interchanger and the power needed to write these signals is wasted.

Figure 5:
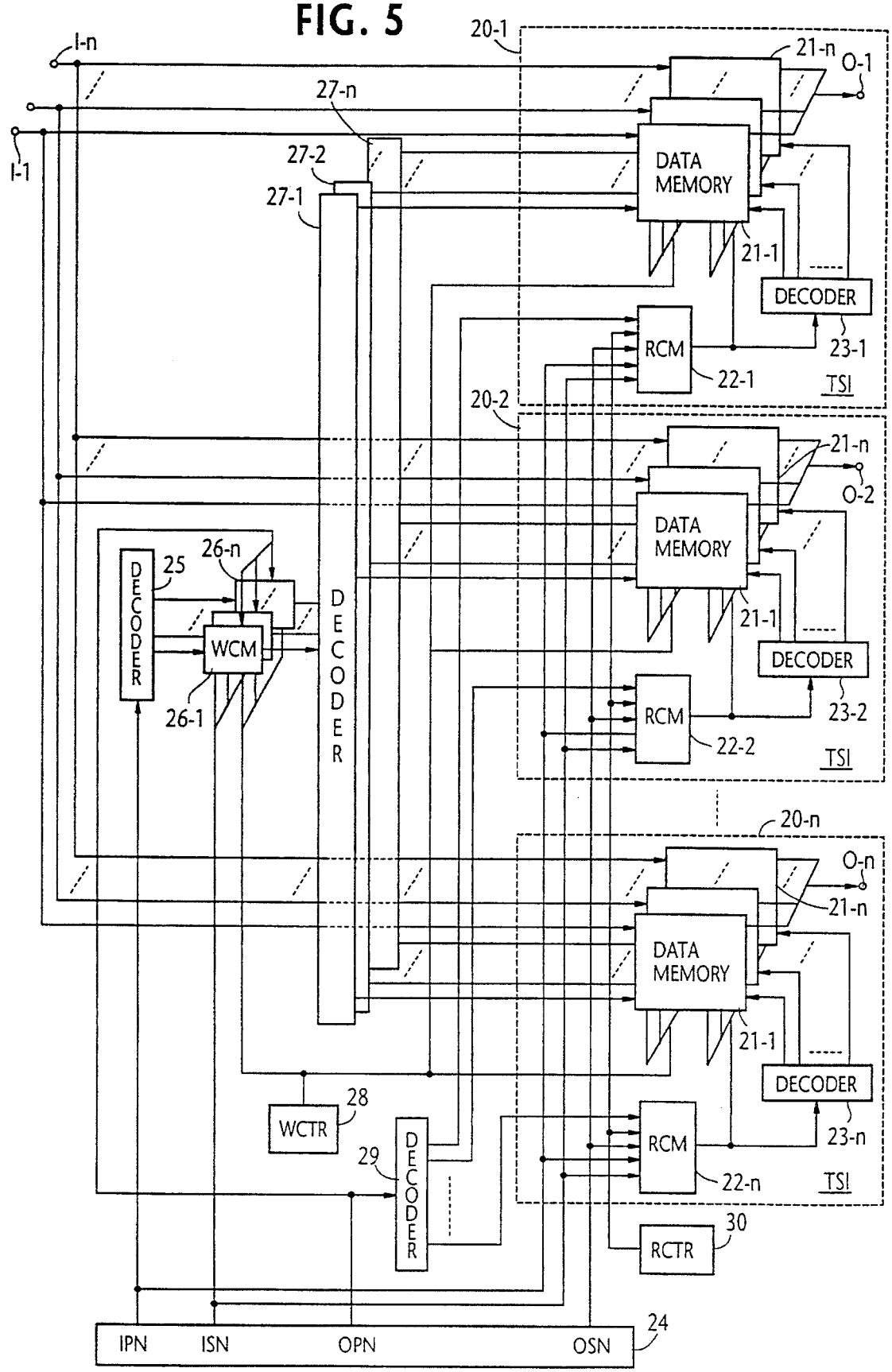
FIG. 5 shows in block diagram form a digital cross-connect time division switching system according to the present invention.

Referring now to FIG. 5, the time-division switching system of the present invention comprises a plurality of time slot interchangers 20-1~20-n provided in a one-to-one correspondence to outlet ports O-1 through O-n, respectively. Data memories 21-1~21-n are provided in each time slot interchanger 20 corresponding to inlet ports I-1~I-n, respectively. Read control memories 22-1~22-n and decoders 23-1~23-n are associated with time slot interchangers 21-1~21-n, and correspond respectively to the read control memories 8 and decoders 9 of FIG. 1.

Console 24 establishes a set of commands for each incoming data signal, or channel. Each command set includes an inlet port number (IPN) identifying one of the inlet ports, an incoming slot number (ISN) identifying an incoming time slot as well as a storage location of each data memory, an outlet port number (OPN) identifying one of the outlet ports, and an outgoing slot number (OSN) identifying an outgoing time slot. Console 24 applies the IPN command of each set to a decoder 25 as well as to all the read control memories in a preferred embodiment, write control memories 26-1~26-n are associated in a one-to-one correspondence with inlet ports I-1~I-n, respectively. Decoder 25 decodes the IPN command and selects one of write control memories 26-1~26-n according to the IPN command signal and stores the ISN and OPN commands into the selected write control memory 26-1 for switching operation. The outputs of write control memories 26-1~26-n are connected respectively to decoders 27-1~27-n. Each decoder 27-i (where 1≦i≦n) is associated with those data memories 21-i which are associated with the selected write control memory 26-i and connected to the inlet port I-i. Accordingly, the outputs of decoder 27-1, for example, are connected to the data memories 21-1 of all time slot interchangers. Each decoder 27-i receives the ISN and OPN commands from the associated write control memory 26-i and supplies a write enable signal through one of n output terminals thereof to one of the data memories 21-i which is identified by the OPN command.

A write address is supplied from a write counter 28 to the write control memories 26-1~26-n as well as to the data memories 21 of each time slot interchanger. Accordingly, the write control memory which is selected by the decoder 25 causes the enabled data memory to store the data signal of an incoming time slot identified by the ISN command into one of its storage locations identified by the same ISN command.

The OPN command is also supplied to decoder 29 which corresponds to the decoder 12 of FIG. 1 to select one of the read control memories 22 in accordance with the OPN command. The selected read control memory 22-i receives the IPN, ISN and OSN commands from the console 24. Decoders 23-1~23-n are respectively connected to the read control memories 22-1~22n to receive the stored IPN, ISN and OSN commands therefrom to enable one of the data memories which are associated with the selected read control memory 22-i in accordance with the received IPN command. Read counter 30 corresponds to the read counter 13 of FIG. 1 to supply a read address to all the read control memories. The selected read control memory 22-i causes the enabled data memory to read a data signal from one of its storage locations which is identified by a read memory address from counter 30 corresponding to the stored ISN command during an outgoing time slot identified by the OSN command.

Figure 6:
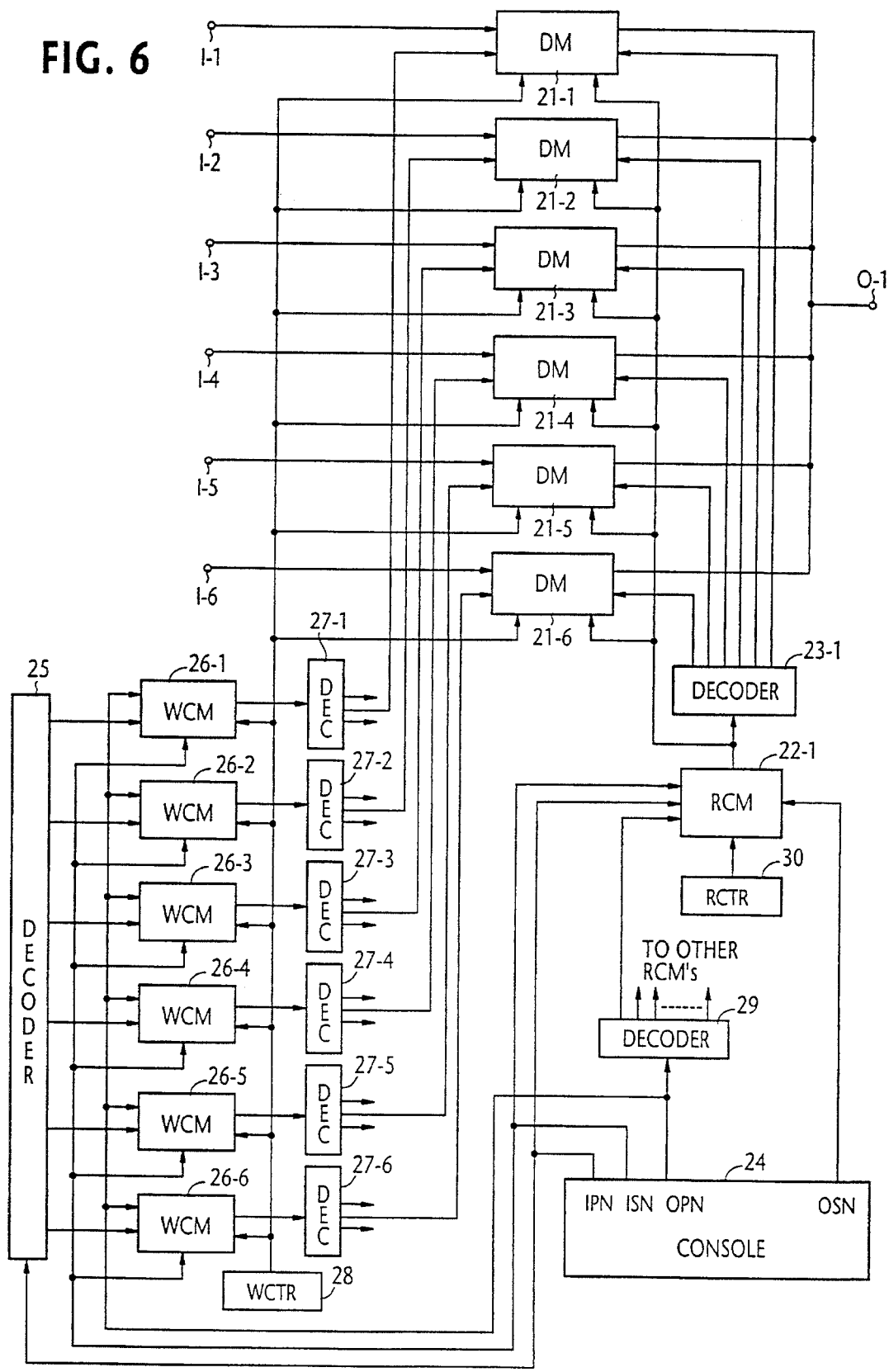
FIG. 6 shows in simplified form the cross-connect system useful for describing the operation of the present invention.

The operation of the present invention will now be described with reference to FIG. 6 in which the time slot interchanger 20-1 and its associated circuits are shown for clarity. In order to reduce the energy consumption of the data memories, the present invention provides write operations to those addresses of the data memories which store the signals to be delivered to the outlet port. Accordingly, if the desired output sequence is the same as that shown in FIG. 2 using the same input signals, then the console 24 produces the following set of commands:

| IPN | ISN | OPN | OSN |
|-----|-----|-----|-----|
| 1   | 3   | 1   | 4   |
| 3   | 1   | 1   | 0   |
| 3   | 2   | 1   | 3   |
| 5   | 0   | 1   | 1   |
| 6   | 4   | 1   | 2   |

In response to the first set of commands IPN=1, ISN=3 and OPN=1, decoder 25 selects the write control memory 26-1 to store the commands ISN=3 and OPN=1 into the write control memory 26-1. When in operation, write control memory 26-1 directs the associated decoder 27-1 to enable one of the data memories 21-1 which are associated with the write control memory 26-1 at the instant a write address MA=3 from write counter 28 corresponds to ISN=3. Thus, write control memory 26-1 is activated during incoming time slot #3 (i.e., MA=3) as seen in FIG. 7 and the data signal A3 of the incoming time slot #3 is stored into the memory address MA=3 of the enabled data memory as illustrated in FIG. 8.

In response to the second set of commands IPN=3, ISN=1 and OPN=1, decoder 25 selects write control memory 26-3 and stores the commands ISN=1 and OPN=1 into the write control memory 26-3. When in operation, the write control memory 26-3 is activated during incoming time slot #1 identified by ISN=1 when it corresponds to the memory address MA=1 and directs the corresponding decoder 27-3 to enable data memory 21-3 to store data signal C1 into the write address MA=1 of the memory.

In response to the third set of commands IPN=3, ISN=2 and OPN=1, decoder 25 selects write control memory 26-3 and stores the commands ISN=2 and OPN=1 into the write control memory 26-3. When in operation, the write control memory 26-3 is activated during incoming time slot #2 identified by ISN=2 when it corresponds to the memory address MA=2 and directs the corresponding decoder 27-3 to enable data memory 21-3 to store data signal C2 into the write address MA=2 of the memory.

The IPN=5 command of the fourth set causes decoder 25 to store the commands ISN=0 and OPN=1 into write control memory 26-5. When In operation, the write control memory 26-5 is activated during incoming time slot #0 identified by ISN=0 when it corresponds to the memory address MA=0 and directs the corresponding decoder 27-5 to enable data memory 21-5 to store data signal E0 into the write address MA=0 of the memory.

In like manner, the IPN=6 command of the fifth set causes decoder 25 to store the commands ISN=4 and OPN=1 into write control memory 26-6. When in operation, the write control memory 26-6 is activated during incoming time slot #4 identified by ISN=4 when it corresponds to the memory address MA=4 and directs the corresponding decoder 27-6 to enable data memory 21-6 to store data signal F4 into the write address MA=4 of the memory.

As a result, the write operations are exclusively performed on the desired data signals as illustrated in FIG. 8. The amount of power consumed for the writing of data signals can be significantly reduced.

Decoder 29 is responsive to the IPN command of each of the first to fifth command sets. In response to the first set of commands IPN=1, ISN=3, OPN=1 and OSN=4, decoder 29 selects the read control memory 22-1 in accordance with command OPN=1 for storing the commands IPN=1, ISN=3 and OSN=4 into the selected read control memory. When in operation, read control memory 22-1 directs the associated decoder 23-1 to enable data memory 21-1 of the time slot interchanger 20-1 at the Instant a read address MA=3 from read counter 30 corresponds to ISN=3 during an outgoing time slot identified by OSN=4. Thus, the data signal A3 is read out of the memory address MA-3 onto the outgoing time slot #4.

In response to the second set of commands IPN=3, ISN=1, OPN=1 and OSN=0, decoder 29 selects the read control memory 22-1 in accordance with command OPN=1 for storing the commands IPN=3, ISN=1 and OSN=0 into the selected read control memory. When in operation, read control memory 22-1 directs the associated decoder 23-1 to enable data memory 21-3 of the TSI 20-1 at the instant a read address MA=1 from read counter 30 corresponds to ISN=1 during an outgoing time slot identified by OSN=0. Thus, the data signal C1 is read out of the memory address MA=1 onto the outgoing time slot #0.

In response to the third set of commands IPN=3, ISN=2, OPN=1 and OSN=3, decoder 29 selects the read control memory 22-1 in accordance with command OPN=1 for storing the commands IPN=3, ISN=1 and OSN=0 into the selected read control memory. When in operation, read control memory 22-1 directs the decoder 23-1 to enable data memory 21-3 of the TSI 20-1 at the instant a read address MA=2 from read counter 30 corresponds to ISN=2 during an outgoing time slot Identified by OSN=3. Thus, the data signal C2 is read out of the memory address MA=2 onto the outgoing time slot #3.

In response to the fourth set of commands IPN=5, ISN=0, OPN=1 and OSN=1, decoder 29 selects the read control memory 22-1 in accordance with command OPN=1 for storing the commands IPN=5, ISN=0 and OSN=1 into the selected read control memory. When in operation, read control memory 22-1 directs the decoder 23-1 to enable data memory 21-5 of the TSI 20-1 at the instant a read address MA=0 from read counter 30 corresponds to ISN=2 during an outgoing time slot identified by OSN=1. Thus, the data signal E0 is read out of the memory address MA=0 onto the outgoing time slot #1.

Likewise, in response to the fifth set of commands IPN=6, ISN=4, OPN=1 and OSN=2, decoder 29 selects the read control memory 22-1 in accordance with command OPN=1 for storing the commands IPN=6, ISN=4 and OSN=2 into the selected read control memory. When in operation, read control memory 22-1 directs the decoder 23-1 to enable data memory 21-6 of the TSI 20-1 at the instant a read address MA=4 from read counter 30 corresponds to ISN=4 during an outgoing time slot identified by OSN=2. Thus, the data signal F4 is read out of the memory address MA=4 onto the outgoing time slot #2.

What is claimed is:

1. A time division switching system having a plurality of inlet ports and a plurality of outlet ports, comprising:

a plurality of time slot interchangers associated respectively with the outlet ports, each interchanger comprising a plurality of data memories having inputs thereof connected respectively to said inlet ports and having outputs thereof connected together to one of the outlet ports with which the interchanger is associated, each of said data memories having a plurality of storage locations;

means for determining a set of commands for each of a plurality of Incoming data signals, the command set including an inlet port number (IPN) identifying one of said inlet ports, an incoming slot number (ISN) identifying an incoming time slot and one of the storage locations of each data memory, an outlet port number (OPN) identifying one of said outlet ports, and an outgoing slot number (OSN) identifying an outgoing time slot;

write control means, including a plurality of write control memories associated respectively with said inlet ports, for selecting one of the write control memories according to the IPN command and storing the ISN and OPN commands into the selected write control memory, selecting one of the data memories which are associated with the selected write control memory in accordance with the stored OPN command, and causing the selected data memory to store the data signal of an incoming time slot identified by the stored ISN command into one of the storage locations thereof identified by the stored ISN command; and read control means, including a plurality of read control memories associated respectively with said time slot interchangers, for selecting one of the read control memories in accordance with the OPN command, storing the IPN, ISN and OSN commands into the selected read control memory, selecting one of the data memories which are associated with the selected read control memory in accordance with the stored IPN command and causing the selected data memory to read a data signal from one of the storage locations thereof identified by the stored ISN command onto an outgoing time slot identified by the stored OSN command.

2. A time division switching system having a plurality of inlet ports and a plurality of outlet port, comprising:

a plurality of time slot interchangers associated respectively with said outlet ports, each interchanger comprising a plurality of data memories having inputs thereof connected respectively to said inlet ports and having outputs thereof connected together to one of the outlet ports with which the interchanger is associated, each of said data memories having a plurality of storage locations;

means for determining a set of commands for each of a plurality of incoming data signals, the command set including an inlet port number (IPN) identifying one of said inlet ports, an incoming slot number (ISN) identifying an incoming time slot and one of the storage locations of each data memory, an outlet port number (OPN) identifying one of said outlet ports, and an outgoing slot number (OSN) identifying an outgoing time slot;

a plurality of write control memories associated respectively with said inlet ports;

a first decoder for selecting one of said write control memories in accordance with the IPN command and storing the ISN and OPN commands into the selected write control memory;

a plurality of second decoders connected respectively to said write control memories for receiving the stored ISN and OPN commands therefrom, and enabling one of the data memories which are associated with the selected write control memory in accordance with the received OPN command, the selected write control memory causing the enabled data memory to store the data signal of an incoming time slot identified by the stored ISN command into one of the storage locations of the enabled data memory identified by the stored ISN command;

a plurality of read control memories associated respectively with said time slot interchangers;

a third decoder for selecting one of the read control memories in accordance with the OPN command and storing the IPN, ISN and OSN commands into the selected read control memory; and a plurality of fourth decoders connected respectively to the read control memories for receiving the stored IPN command therefrom and enabling one of the data memories which are associated with the selected read control memory in accordance with the received IPN command, the selected read control memory causing the enabled data memory to read a data signal from one of the storage locations thereof identified by the stored ISN command onto an outgoing time slot identified by the stored OSN command.

3. An apparatus for interchanging time slots, comprising:

a plurality of inlet ports and an outlet port;

a plurality of memories having inputs thereof connected respectively to said inlet ports and having outputs thereof connected together to said outlet port, each of said data memories having a plurality of storage locations;

means for determining a set of commands for each of a plurality of incoming data signals, the command set including an inlet port number (IPN) identifying one of said inlet ports, an incoming slot number (ISN) Identifying an incoming time slot and one of the storage locations of each memory and an outgoing slot number (OSN) identifying an outgoing time slot;

write control means for storing the ISN command, selecting one of the memories in accordance with the IPN command and causing the selected memory to store the data signal of an incoming time slot identified by the stored ISN command into one of the storage locations thereof identified by the stored ISN command; and read control means for storing the IPN, ISN and OSN commands, selecting one of the memories in accordance with the stored IPN command and causing the selected memory to read a data signal from one of the storage locations thereof identified by the stored ISN command onto an outgoing time slot identified by the stored OSN command.

4. In a time division switching system having a plurality of inlet ports and a plurality of outlet ports, comprising:

a plurality of time slot interchangers associated respectively with said outlet ports, each interchanger comprising a plurality of data memories having inputs thereof connected respectively to said inlet ports and having outputs thereof connected together to one of the outlet ports with which the interchanger is associated, each of said data memories having a plurality of storage locations; and means for determining a set of commands for each of a plurality of incoming data signals, the command set including an inlet port number (IPN) identifying one of said inlet ports, an incoming slot number (ISN) identifying an incoming time slot and one of the storage locations of each data memory, an outlet port number (OPN) identifying one of said outlet ports, and an outgoing slot number (OSN) identifying an outgoing time slot, a method comprising the steps of:

a) selecting one of the inlet ports according to the IPN command;

b) selecting one of the data memories which are associated with the selected inlet port in accordance with the OPN command;

c) causing the selected data memory to store the data signal of an incoming time slot identified by the stored ISN command into one of the storage locations thereof identified by the stored ISN command;

d) selecting one of the outlet ports in accordance with the OPN command;

e) selecting one of the data memories which are associated with the selected outlet port in accordance with the IPN command; and f) causing the data memory selected by the step (e) to read a data signal from one of the storage locations thereof identified by the ISN command onto an outgoing time slot identified by the OSN command.

5. A device for controlling the storage and retrieval of data comprising:

a plurality of data memories arranged in a plurality of memory groups;

a plurality of inlet ports each connected to a corresponding data memory in each memory group;

a plurality of outlet ports each connected to each of the data memories in a corresponding memory group;

write control means for selecting an intended data memory based on a particular inlet port and outlet port, and causing data to be stored in said selected data memory; and read control means for selecting an intended data memory based on a particular inlet port and outlet port, and causing data to be read from said selected data memory.

6. A method for controlling the storage and retrieval of data comprising the steps of:

arranging a plurality of data memories into a plurality of memory groups;

connecting each one of a plurality of inlet ports to a corresponding data memory in each memory group;

connecting each one of a plurality of outlet ports to each of the data memories in a corresponding memory group;

selecting an intended data memory based on a particular inlet port and outlet port;

causing data to be stored in the selected data memory;

selecting an intended data memory based on a particular inlet port and outlet port; and causing data to be read from said selected data memory.

* * * * *

UNITED STATES PATENT AND TRADEMARK OFFICE
CERTIFICATE OF CORRECTION

PATENT NO. : 5,509,005
DATED : April 16, 1996
INVENTOR(S) : Mamoru Nagamoto

It is certified that error appears in the above-indentified patent and that said Letters Patent is hereby corrected as shown below:

Column 4, line 44, delete "26-1" and insert --26-i--.

Signed and Sealed this

Thirtieth Day of July, 1996

Attest:

BRUCE LEHMAN

Attesting Officer

Commissioner of Patents and Trademarks